United States Patent
Yates et al.

(10) Patent No.: US 10,936,954 B2
(45) Date of Patent: Mar. 2, 2021

(54) DATA TRANSMISSION BETWEEN TWO SYSTEMS TO IMPROVE OUTCOME PREDICTIONS

(71) Applicant: Facebook, Inc., Menlo Park, CA (US)

(72) Inventors: Andrew Donald Yates, San Francisco, CA (US); Gunjit Singh, San Francisco, CA (US); Kurt Dodge Runke, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 853 days.

(21) Appl. No.: 15/447,068

(22) Filed: Mar. 1, 2017

(65) Prior Publication Data

US 2018/0253651 A1 Sep. 6, 2018

(51) Int. Cl.
  *G06N 5/02* (2006.01)
  *G06Q 50/00* (2012.01)
  *G06N 20/00* (2019.01)

(52) U.S. Cl.
  CPC ........... *G06N 5/02* (2013.01); *G06N 20/00* (2019.01); *G06Q 50/01* (2013.01)

(58) Field of Classification Search
  CPC .......... G06N 5/02; G06N 20/00; G06Q 50/01
  See application file for complete search history.

(56) References Cited

U.S. PATENT DOCUMENTS

| | | | | |
|---|---|---|---|---|
| 7,451,065 B2 * | 11/2008 | Pednault | ............... | G06K 9/6219 703/2 |
| 8,762,314 B2 * | 6/2014 | Dhurandhar | ............. | G06N 5/02 706/46 |
| 8,930,289 B2 * | 1/2015 | Bilenko | ............... | G06K 9/6231 706/12 |
| 10,037,491 B1 * | 7/2018 | Fang | ....................... | G06N 20/00 |
| 10,152,363 B2 * | 12/2018 | Schellenberger | ... | G06F 11/0769 |
| 2005/0038832 A1 * | 2/2005 | Feigenbaum | ....... | G06F 11/0748 |
| 2010/0030764 A1 * | 2/2010 | Koren | ................ | G06Q 30/0201 705/7.29 |

(Continued)

OTHER PUBLICATIONS

Hao Wang "Collaborative Deep Learning for Recommended System" Aug. 2015, Hong Kong university of science and technology (Year: 2015).*

*Primary Examiner* — Kamran Afshar
*Assistant Examiner* — Imad Kassim
(74) *Attorney, Agent, or Firm* — Fenwick & West LLP

(57) ABSTRACT

An online system generates predicted outcomes for a content distribution program that distributes content to users of the online system, the predicted outcome indicating a likelihood for the occurrence of an outcome of a content presentation. The online system transmits the one or more predicted outcomes to the third party system, and receives prediction improvement data from the third party system, the prediction improvement data indicating an adjustment to errors in the predicted outcomes based on a prediction by the third party system. The online system updates the properties of a content distribution program based on the prediction improvement data, the updated content distribution program causing the online system to generate new predicted outcomes based on the prediction improvement data in content presentation opportunities. The online system also transmits content to users of the online system based on the updated content distribution program.

20 Claims, 3 Drawing Sheets

(56) References Cited

U.S. PATENT DOCUMENTS

| | | | |
|---|---|---|---|
| 2010/0100516 A1* | 4/2010 | Zhou | G06N 5/02 |
| | | | 706/46 |
| 2011/0295762 A1* | 12/2011 | Scholz | G06Q 30/02 |
| | | | 705/347 |
| 2014/0303953 A1* | 10/2014 | Bates | G06Q 30/02 |
| | | | 703/13 |
| 2015/0370863 A1* | 12/2015 | Modarresi | G06F 16/2462 |
| | | | 707/722 |
| 2016/0092786 A1* | 3/2016 | Mehanna | G06N 20/00 |
| | | | 706/11 |
| 2017/0004408 A1* | 1/2017 | Edelen | G06Q 30/02 |
| 2017/0097982 A1* | 4/2017 | Zhang | G06F 16/285 |
| 2017/0161773 A1* | 6/2017 | Xu | G06F 16/2455 |
| 2017/0186030 A1* | 6/2017 | Jiang | G06F 17/18 |
| 2018/0246891 A1* | 8/2018 | Wei | G06Q 30/0277 |

\* cited by examiner

DATA TRANSMISSION BETWEEN TWO SYSTEMS TO IMPROVE OUTCOME PREDICTIONS

BACKGROUND

This disclosure relates generally to online systems, and in particular to data transmission between two systems to improve outcome predictions.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, an online system provides an ideal forum for third parties to present content to online system users.

In some cases, the online system distributes content from third party systems to the online system users. This transmission of content to the client devices of users may be due to a request message received by the online system from the third party system. In the transmission of content to users, the online system may attempt to predict the likely outcome of the content distribution. For example, the online system may attempt to predict a likely user response to the content presentation. Such a prediction, for example, may be used by the online system in determining which users are presented with what content. However, the prediction made by the online system may be inaccurate. The third party system, on the other hand, may have additional data that it can pass to the online system that may be able to improve this prediction. However, this information may be proprietary or confidential and cannot be shared with the online system. Thus, what is lacking is an method of data sharing between two systems to improve outcome predictions without the disclosure of confidential information.

SUMMARY

Embodiments of the disclosure include an online system that is capable of receiving data from a third party system to improve the accuracy of the prediction of outcomes in content distribution programs.

In one embodiment, the online system generates predicted outcomes using a trained outcome prediction model for content presentations to users of the online system. Each of these predicted outcome indicates a likelihood of a particular user interaction in response to a user being presented with the content from a third party system. The online system generates prediction error information and transmits this information to the third party system. The prediction error information includes information for the third party system to model an outcome error between the predicted outcomes and the actual outcomes. After transmitting the prediction error to the third party system, the third party system may train an error prediction model for the outcome error using input data sourced from the third party system.

After modeling the error, the third party system transmits prediction improvement data to the online system. The prediction improvement data may include feature data sourced from the third party system that increases the accuracy of the error prediction model, or may simply include an adjustment factor used to adjust the predicted outcomes to reduce the outcome error. Because the online system need not know of the actual semantics of the feature data in order to use it, the feature data received from the third party system may be obfuscated (e.g., by various transforms), such that the semantics of the additional feature data are undiscoverable from the additional feature data itself. This ensures the confidentiality of the data.

The online system selects content items for presentation to users of the online system based on predicted outcomes generated using this prediction improvement data. When the prediction improvement data includes additional features, the online system may re-train the outcome prediction model with the additional feature data as additional input data for the outcome prediction model, and use the model to generate predicted outcomes for pairs of content items and users, selecting content items for presentation to users in the content presentation opportunities based on the new predictions. Once selected, the online system transmits the selected content items to users for presentation.

Alternatively, when the prediction improvement data includes an adjustment factor(s), the online system may generate predicted outcomes for pairs of content items and users in content presentation opportunities based on the original outcome prediction model, modify the predicted outcomes based on the adjustment factor(s), and select content items for presentation to users in the content presentation opportunities based on the modified predicted outcomes.

Using the system described above, the online system is able to provide to the third party system with the ability to improve the selection of users to whom content from the third party system is presented by passing additional information to the online system, while still being able to hide the actual meaning behind any data that is passed to the online system, thus ensuring the continued confidentiality and privacy of data belonging to the third party system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Architecture

Figure 1:
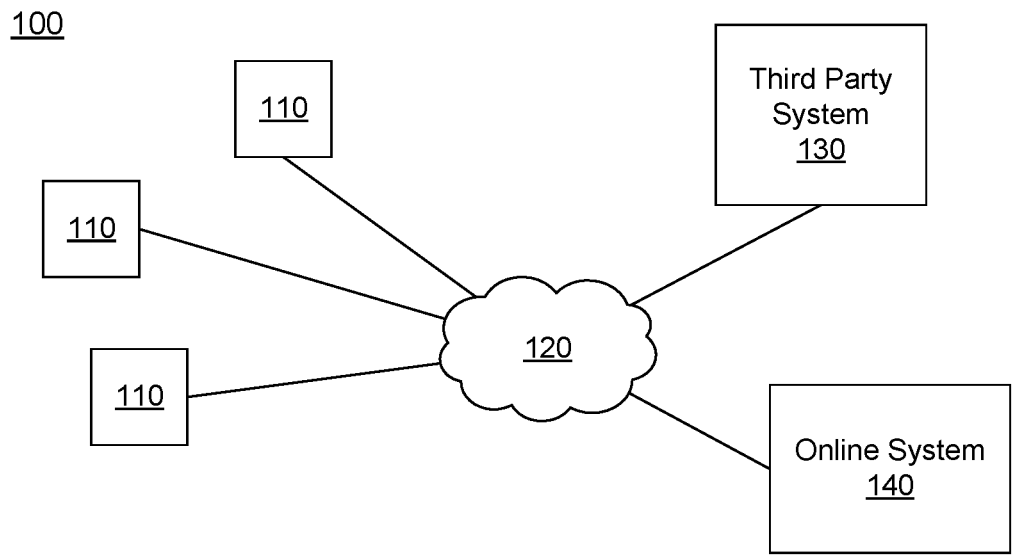
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as content, or information about an application provided by the third party website 130. Specifically, in one embodiment, a third party system 130 transmits the sponsored content to the online system 140 for display to users of the client devices 110. The sponsored content may be created by the entity that owns the third party system 130. Such an entity may be a company producing a product, service, message, or something else that the company wishes to promote.

II. Example Online System

Figure 2:
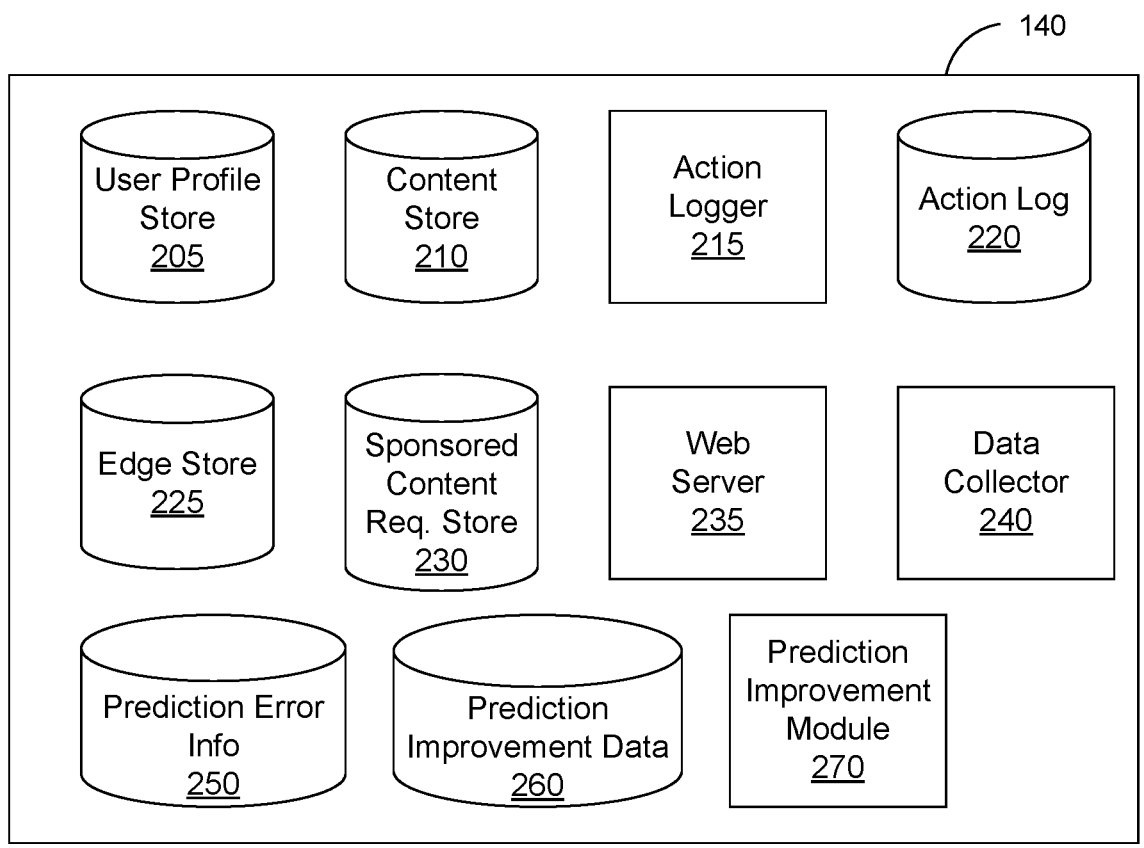
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 230, a web server 235, data collector 240, prediction error info 250, prediction improvement data 260, and prediction improvement module 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with sponsored content on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, sponsored content that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The sponsored content request store 230 stores one or more sponsored content requests. Sponsored content is content that an entity (i.e., a sponsored content provider) presents to users of an online system and allows the sponsored content provider to gain public attention for products, services, opinions, causes, or messages and to persuade online system users to take an action regarding the entity's products, services, opinions, or causes. A sponsored content request includes sponsored content and a value amount (e.g., a "bid value"). The sponsored content is text, image, audio, video, or any other suitable data presented to a user. In various embodiments, the sponsored content also includes a landing page specifying a network address to which a user is directed when the sponsored content is accessed. The value amount is associated with an ad request by a sponsored content provider (who may be the entity providing the sponsored content) and is used to determine an expected value, such as monetary compensation, provided by a sponsored content provider to the online system 140 if sponsored content in the sponsored content request is presented to a user, if the sponsored content in the sponsored content request receives a user interaction when presented, or if any suitable condition is satisfied when sponsored content in the sponsored content request is presented to a user. In some embodiments, the expected value to the online system 140 of presenting the sponsored content may be determined by multiplying the value amount by a probability of the sponsored content being accessed by a user. In one embodiment, a sponsored content is an advertisement.

Additionally, a sponsored content request may include one or more targeting criteria specified by the sponsored content provider. Targeting criteria included in a sponsored content request specify one or more characteristics of users eligible to be presented with sponsored content in the sponsored content request. For example, targeting criteria are used to identify users having user profile information, edges, or actions satisfying at least one of the targeting criteria. Hence, targeting criteria allow an sponsored content provider to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows sponsored content providers to further refine users eligible to be presented with sponsored content from an sponsored content request. As another example, targeting criteria identifies users having a connection to another user or object or having a particular type of connection to another user or object.

The web server 235 links the online system 140 via the network 120 to the one or more client devices 110, as well as to the one or more third party systems 130. The web server 235 serves web pages, as well as other web-related content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 235 may provide application programming interface (API) functionality to send data directly to native client device operating systems, such as IOS®, ANDROID™, WEBOS® or RIM®.

Data Collector

The data collector 240 collects the prediction error info 250 for transmission to a third party system 130 for the determination of the prediction improvement data. For each content distribution program, the data collector 240 may collect predicted outcome and actual outcome information, in addition to other supporting data.

A content distribution program includes instructions and specifications from a third party system 130 to the online system 140 for how to distribute content items to users of the online system for presentation. Thus, the execution of the content distribution program by the online system 140 results in a series of content presentations to users of the online system. The content that is presented is provided or specified by the third party system 130. The content may be, for example, sponsored content, as described above, and the third party system 130 may be an advertiser. The content distribution program additionally specifies a set of user specifications that define a set of one or more user characteristics (e.g., demographics), user actions in the online system 140, and other events or details that may be used to identify users. For example, user specifications could specify males age 18-24 who have liked the page of a sports drink page on the online system 140. In one embodiment, the user specifications include the targeting criteria described above. Those users of the online system that meet the user specifications are presented with the content of the content distribution program.

The content distribution program may include additional details, such as user values, a total value, and a timeframe. The user values indicate an amount of resources (e.g., computer resources, human resources, monetary compensation) that a third party system 130 may wish to expend to have the opportunity to present content to a user. The user values may be specific to individual users, or may be the same for multiple users. In one embodiment, the user values are modified by the online system 140 for each user based on the likelihood of the user to perform the desired outcome specified by the third party system 130 (e.g., such as in an optimized cost per mile (CPM) program). In one embodiment, the user value is the bid value as described above.

The total value indicates a total number of resources a third party system 130 has indicated to expend for the entire content distribution program. These are usually the same type of resources that are specified by the user value. The timeframe indicates a schedule, e.g., day of the week, start and stop timestamp, etc., that indicates when to execute the content distribution program. Outside the schedule, the program is not executed, and no content from the program is transmitted to users' client devices for presentation.

The outcome indicates a selected user interaction which may be caused by presenting the content to the users in the content distribution program. The user interaction may include any type of interaction or action caused by the user, such as a click, view, like, user registration, purchase, install, comment post, etc., or any of the other actions described above (with reference to the sponsored content request store). The user interaction may occur at the third party system 130 or at the online system 140. The user interaction may occur immediately after the presentation of the content or many days, months, or years after. In one embodiment, the outcome may be known as a conversion. In another embodiment, an outcome is specifically the case where a user clicks (or otherwise interacts) with the content presented to the user, causing the user's client device to direct the user to a source, such as a web page, provided by the third party system 130, in accordance with executable instructions (e.g., a hyperlink) provided along with the content item. The particular outcome for a content distribution program may be selected by the third party system 130 or (as a default selection) the online system 140. In general, the occurrence of the outcome confers some benefit or is desirable to the third party system 130. In one embodiment, the outcome indicates events other than a user interaction that may be caused from presentation of the content to a user, such as some indirect event that may not be caused directly by a user interaction.

When a target user utilizes the online system 140, one or more content presentation opportunities may arise. These opportunities are where the online system 140 may select content from one of many content distribution programs to present content to the user. For each content presentation opportunity, the online system 140 selects a content item from a plurality of content distribution programs from different third party systems 130 for presentation to the target user. The online system 140 may select such opportunities based on which content distribution program specifies the highest user value, the number of user specification elements of the content distribution program that the target user matches, and so on. In one embodiment, the online system 140 also selects a content item based on a predicted outcome for that combination of content and user. The predicted outcome is estimated by the online system 140 and determines the likelihood that the outcome specified by the third party system 130 in the content distribution program would occur if the content from the program were presented to the user. If the predicted outcome is higher for a content item, that content item may be selected for presentation over another content item with a lower predicted outcome.

The predicted outcome may be computed by the online system 140 from analyzing historical data for the target user, for the third party system 130, for the content distribution program, and so on. From this analysis, the online system 140 may be able to determine a historical rate of outcome occurrence given similar circumstances, and determine that the predicted outcome should be the same or similar to this historical rate. For example, a predicted outcome (e.g., the chance of a click) may be computed as 50% for a content item and user based on the user's outcome occurrence for content items from similar content distribution programs in the past.

In one embodiment, the online system 140 may use machine learning models to determine the predicted outcome of a content item from a content distribution program. Different models may be trained for different groups of content distribution programs and/or third party systems 130 having similar characteristics. Each model may be trained from historical data including information about users, content presented, whether an outcome occurred, keywords for characteristics, and so on. Using the model, the online system 140 is able to estimate the likelihood of an outcome occurring, i.e., the predicted outcome. In one embodiment, the predicted outcome is also known as an estimated conversion rate (eCVR) and/or an estimated click thru rate (eCTR).

Additional details regarding the estimation of the outcome likelihood are described in U.S. application Ser. No. 15/261,746, filed Sep. 9, 2016, and Ser. No. 15/203,786, filed Jul. 6, 2016, both of which are incorporated by reference in their entirety.

When a content item is presented to a user, the data collector 240 may collect a content identifier, contextual metadata, an identifier of the user that the content was presented to, a timestamp, the predicted outcome as computed by the online system 140 for the content presentation, and the actual outcome for the content presentation, if any.

The content and user identifiers identify the content and user respectively. These identifiers may be retrieved or received by the data collector 240 from the third party system 130, such that the identifiers are shared between the online system 140 and the third party system 130. For example, the user identifiers could be email addresses. The user identifiers may also be hash values, such that no personally identifiable information can be extracted using the user identifiers. In one embodiment, the third party system 130 is able to use an application programming interface (API) to determine a number of shared user identifiers.

The contextual metadata may include contextual information about the content presentation, such as on what type of device (e.g., mobile, desktop, etc.) the content presentation was made, the geolocation of the network address from which the user's client device is accessing, the location in the online system 140 where the user was visiting/browsing, the user value selected, content distribution program identifier, etc.

The actual outcome indicates whether the outcome actually occurred for the content presentation. For example, if the outcome indicates a click by a user, then if a user actually performed a click, then the actual outcome indicate that the click did occur. This is in contrast to the predicted outcome, which predicts whether the click might occur (e.g., as a percentage or real values representing an outcome of the click, e.g., a monetary value).

The data collector 240 may collect some or all of the data described above. The data collector 240 may collect data to different levels of granularity and detail for different content distribution programs. At the highest granularity, the data collector 240 collects every content presentation. At lower granularities, the data collector 240 may collect only a random sampling of content presentations. The data collector 240 may collect data at differing levels of detail. At the highest levels of detail, the information collected is stored as-is without modification. At lower levels of detail, the data collector 240 may "fuzz" the data by obfuscating it, reducing the data's degree of accuracy (e.g., by removing significant digits, giving only a general range, etc.), deleting parts of the data, and so on. For example, instead of collecting a timestamp, the data collector 240 only stores a counter value that increments for each new content presentation recorded (for each content distribution program). In one embodiment, the data collector 240 only collects the predicted outcome without any additional information. In another embodiment, the data collector 240 only collects the predicted outcome along with the content identifier.

The data collector 240 stores the collected information as the prediction error info 250.

Prediction Error Info

The prediction error info 250 includes the data collected by the data collector 240. This data may be transmitted by the online system 140 to the third party system 130 automatically or upon request from the third party system 130. A third party system 130 only receives the data in the prediction error info 250 that is related to content that the third party system 130 provided or selected for presentation to users of the online system 140. The related prediction error info 250 may be transmitted in batch, in real-time, via an API, or through some other means.

Once transmitted to the third party system 130, the third party system 130 models the outcome error in the prediction error info 250. The outcome error is the error between the actual outcome and the predicted outcome for a content presentation. The outcome error may be represented by a numerical difference between the outcome prediction value and the actual outcome. For example, the actual outcome may have been assigned numerical values for whether the selected outcome for a content presentation occurred or did not occur (e.g., 0 for no click, and 1 for click), and the outcome error would be the difference between the numerical representation of the outcome, and the numerical representation of the predicted outcome.

Figure 3:
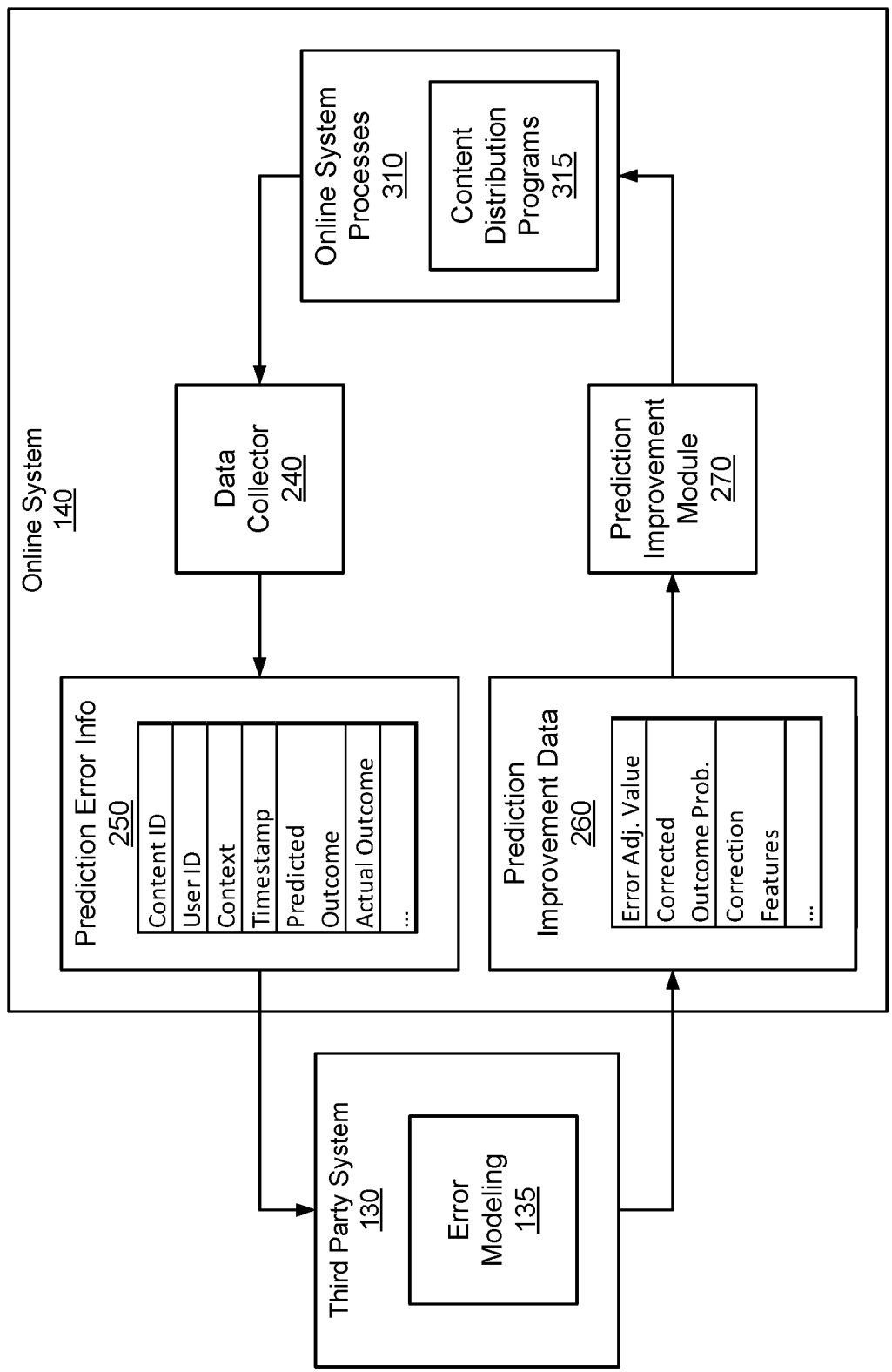
FIG. 3 is a hybrid data flow diagram illustrating the path of data in a method for transmitting data between the third party system and the online system to improve prediction of outcomes, according to an embodiment.

Additional details regarding modeling the outcome error by the third party system are described below with reference to FIG. 3.

Prediction Improvement Data

The prediction improvement data 260 is received by the online system 140 from the third party system 130 based on the modeling performed by the third party system 130 on the outcome error. In cases where the third party system 130 may not be able to develop a sufficient model for the outcome error that would be able to predict it accurately, the online system 140 may receive an indication of such. Otherwise, the online system 140 receives the prediction improvement data 260 from the third party system.

The prediction improvement data 260 may be in various formats, but allows for the online system 140 to reduce the outcome error, either by allowing the online system 140 to compute a more accurate predicted outcome, or by allowing the online system 140 to adjust the predicted outcome after it is generated.

In the former case, the prediction improvement data 260 may include additional features provided by the third party system 130 for the online system 140 (i.e., third party feature data) to compute a more accurate predicted outcome.

In the latter case, the prediction improvement data 260 may include an adjustment factor, which can be used by the online system 140 to adjust the value of the predicted outcome after generating it.

While in the former case, the prediction improvement data 260 may include the various features used by the third party system 130 to generate its model, in the latter case the third party system 130 need only transmit an adjustment factor. This latter option allows the third party system 130 to obfuscate the features which were used to predict the outcome error from the online system 140, as these features may in some cases include confidential information for the third party system 130. For example, the third party system 130 may have data that could put the third party system 130 at a competitive disadvantage if competitor were to discover that data. In such a scenario, while this information may help the online system 130 in reducing the outcome error, it may be risky for the third party system 130 to directly share it with the online system 130. Instead, the third party system 130 may only transmit the adjustment factor.

The prediction improvement data 260 may be received in batch, or in real-time. In one embodiment, the prediction improvement data 260 is in key-value form. For example, the key could be a shared user identifier, with the value being the data described above (i.e., the features or the adjustment factor). The prediction improvement data 260 could include information indicating an expiry data at which point the data would no longer be valid.

In one embodiment, the online system 140 generates predicted outcomes and related data for a (maximum number of) predicted users for whom the online system 140 has determined are likely (e.g., beyond a threshold percentage or other value) to be presented with content from the third party system 130. The online system 140 generates this information prior to presenting content to these users. The online system 140 transmits this information to the third party system 130 as prediction error info 250, allowing the third party system 130 to pre-emptively model the outcome error for these users, and return prediction improvement data 260 for these users.

Prediction Improvement Module

The prediction improvement module 270 uses the prediction improvement data 260 to improve the accuracy of the predicted outcomes generated by the online system 140 for corresponding content distribution programs.

As noted above, the prediction improvement data 260 may include either raw features that may be incorporated into the computation of the predicted outcome, or may include an adjustment factor for the predicted outcome.

In the first case, the prediction improvement module 270 may further train an existing or new machine learning model (e.g., a neural network, linear regression model, etc.) using the additional features received in the prediction improvement data 260. The model may use the previously collected actual outcome data from the prediction error info 250 with the new features provided by the third party system 130 in the prediction improvement data 260. Thus, for example, the data collector 240 may have collected a large number of outcome results for previous content presentations. The online system 140 uses these actual outcome results as output labels. For input features, the online system 140 uses the new features provided in the prediction improvement data 260, as well as other features available to the online system 140 and related to each outcome, such as the characteristics of users that were presented with the content, the characteristics of the content itself, contextual metadata regarding the content presentation. With this information, the prediction improvement module 270 re-trains an existing model or a new model to predict a more accurate predicted outcome.

In one embodiment, the features received in the prediction improvement data 260 from the third party system 130 may be specific to users of the online system. For example, each feature may have an associated shared user identifier. The prediction improvement module 270 may store these user-based features as custom user features for the third party system 130 in the profile of each associated user. Subsequently, during a content presentation, the online system 140 may generate additional predictors based on these customer user features, and use these predictors to influence the selection of content for content presentation. For example, the third party system 130 may determine that users who have searched for a particular term on the third party system's website may be more likely to cause the selected outcome to occur when presented with content at the online system 140. The third party system 130 may thus indicate such a search (possibly as an obfuscated feature) to the online system 140 as a custom user feature in order to improve the accuracy of the predicted outcome computation.

Additional details regarding customer user features are described in U.S. application Ser. No. 15/206,211, file Jul. 8, 2016, and which is herein incorporated by reference in its entirety.

In addition to custom features for users, in one embodiment, the prediction improvement data 260 that is received from the third party system 130 may include custom feature data (e.g., in the form of a feature vector) for content as well as users. The exact semantics of this feature data, along with the feature data for users, may be unknown the online system 140, thus allowing the third party system 130 to preserve the confidentiality of the data if needed. However, the online system need not know about the exact nature of the features. There only needs to be sufficient feature data to be used as input data to generate a more accurate prediction of the outcome. When both user and content feature data is provided, the prediction improvement module 270 can store this data with the appropriate user profiles and content (e.g., in the user profile store 205 and the sponsored content request store 230 or the content store 210). These user and content feature data components may later be combined to generate a combined score (e.g., via a dot product of the user and content feature vector data), which may be used as a feature in the above model that is trained by the prediction improvement model 270 to make predicted outcomes, or the combined score may be used to directly modify the predicted outcome. For example, if the combined score is high, then the predicted outcome may be increased.

Additional details regarding the combined use of user and content feature data received from a third party system are described in U.S. application Ser. No. 15/365,899, filed Nov. 30, 2016, which is incorporated herein by reference in its entirety.

In the second case as described above, instead of raw features, the online system 140 only receives an adjustment factor in the prediction improvement data 260. As noted, this adjustment factor is used to adjust an already computed predicted outcome for a content presentation to a user, rather than as an input in computing the predicted outcome. In one embodiment, the prediction improvement module 270 adjusts (e.g., by subtracting from or adding to) the predicted outcomes generated by the online system 140 by the adjustment factor in the prediction improvement data 260. In one embodiment, the online system 140 receives multiple adjustment factors, which may correspond to each user, sets of users, sets of content items, and so on. In such a case, the prediction improvement module 270 adjusts the generated predicted outcomes based on the corresponding adjustment factor.

Additional details regarding the above described simulation method are provided below with reference to FIGS. 3-4.

Exemplary Advantages

Using the system described above, the online system 140 is able to provide to the third party system 130 with the ability to improve the selection of users to whom content from the third party system is presented by passing additional information to the online system, while still being able to hide the actual meaning behind any data that is passed to the online system, thus ensuring the continued confidentiality and privacy of data belonging to the third party system. This advantage applies to the online system as well, as it need only transmit the outcome error information, as described above, and so no other proprietary information is transmitted. In addition, the online system, using this method, can more effectively and efficiently present content to those users that are most likely to cause the outcome to occur. Additionally, the third party system may be able gather more accurate statistics using the more objective outcome error data. Traditionally, the third party system 130 may only be able to gather data about content presentations in comparison with other third party systems 130 which are competing (e.g., bidding) for the same content presentation opportunity. This presents data that may be inaccurate due to the changing influence from the other third party systems. Instead, by using the error outcome data, the third party system 130 can have a cleaner set of data on which to base computations for long term outcome rates and other statistics.

III. Exemplary Diagram Illustrating Data Flow for Transmitting Data Between the Third Party System and the Online System to Improve Prediction of Outcomes FIG. 3 is a hybrid data flow diagram illustrating the path of data in a method for transmitting data between the third party system and the online system to improve prediction of outcomes, according to an embodiment. Although a certain data flow and data elements are shown in FIG. 3, in other embodiments a different data flow and/or different elements are used.

Initially, the data collector 240 collects information about content presentations made to users of the online system 140. This information is stored as the prediction error info 250. As noted above, the prediction error info 250 may include more detailed information about each content presentation, such as the content identifier, user identifier, contextual metadata, timestamp, predicted outcome, actual outcome, etc., or may simply indicate the outcome error.

This information is transmitted by the online system 140 to the third party system 130. The third party system performs error modeling 135 on the outcome error provided by the prediction error info 250. As noted, the outcome error is the error between the actual outcome and the predicted outcome for a content presentation. The outcome error may be represented by a numerical difference between the predicted outcome and the actual outcome, or may be binary, being set to one value (e.g., 0) if the difference between the predicted outcome and the actual outcome exceeds a threshold or set to another value (e.g., 1) if the opposite is true. For example, if the predicted outcome is 85%, and the actual outcome is 1 (i.e., true), then the outcome error may be 0.15 or may be 0 if the threshold is, e.g., 25%.

The third party system 130 may model the outcome error over multiple content presentations using the prediction error info 250. The data in the prediction error info 250 (e.g., the user identifier and the content identifiers) may be used to identify for the third party system 130 the associated user and content related to each outcome error, which may be used to identify additional data related to the associated content presentation that is available to the third party system 130. The third party system may also retrieve additional input data sourced from the third party system 130 as input data for training the model of the outcome error. The outcome error serves as the output label data for training the model.

The third party system 130 may use various techniques to model the outcome error, such as using linear regression, gradient boosted decision trees, neural networks, clustering, any other modeling techniques, and/or a combination thererof. If the third party system 130 is able to model the outcome error, the online system 140 receives from the third party system the prediction improvement data 260. As noted above, the third party system 130 may transmit as prediction improvement data 260 those features used to model the outcome error which the third party system 130 determined to be significant in predicting the outcome error. These may be features that increase the accuracy of the prediction of the outcome error (e.g., as measured by a statistical variance) beyond a threshold amount, when the model is used on a set of verification data (e.g., a randomly sampled subset of the prediction error info 250).

As these features may comprise any value, the third party system 130 is free to choose the format of the feature. Thus, while the feature may be derived from a confidential piece of information, the third party system 130 can modify the feature such that the confidential nature of the information is no longer apparent. For example, the third party system 130 may change the scale, change the granularity, transform the data, etc., in order to create a feature that is relevant to the prediction of the outcome error, but no longer presents any knowledge of the underlying information used to create it.

Instead of providing the features in the prediction improvement data 260, in one embodiment, the third party system 130 may only transmit an adjustment factor adjusting for the inaccurate predicted outcomes computed by the online system 140. The third party system 130 may derive this value from the modeling of the outcome error. If the outcome error includes a systemic component (i.e., all outcome errors have a minimum error amount), then the third party system 130 may set the adjustment factor to this systemic component. Alternatively, the third party system 130 may compute a more granular set of adjustment factors, with one for each user, group of users (e.g., those with certain characteristics), content item, content distribution program, and so on, based on patterns in outcome error that the third party system 130 has determined from modeling the outcome error over a large amount of data.

However, if the third party system 130 is unable to fit a model to the error properly using any available features (e.g., the error as modeled by the third party system 130 exceeds the actual error by a variance threshold), then the third party system 130 may notify the online system of the failure.

In one embodiment, the third party system 130 may access some API or other software provided by the online system 140 for the modeling of the outcome error. This online system-provided model may accept, during training, the outcome error amounts as output labels and as input any of third party system features provided by the third party system (e.g., an embedding of various third party features specified by the third party system 130). The model determines which features provided by the third party system 130 weigh strongly in the prediction of the outcome error. These features may be included in the prediction improvement data 260. The model may use various methods, such as an ensemble learning method, a neural network, support vector machine, clustering, or any other machine learning method, such as those described above. This model may be provided by the online system 140 for execution on the third party system.

The prediction improvement data 250 is provided by the third party system 130 and includes features that may be integrated into the online system 140 to assist in predicting a more accurate predicted outcome and/or may include an adjustment factor that can be used by the online system 140 to adjust the computed predicted outcomes.

Regardless of the format of the prediction improvement data 250, the prediction improvement module 270 uses the prediction improvement data 250 to have the online system 140 generate more accurate predicted outcomes for content presentations, as described above with regards to FIG. 2.

After processing the prediction improvement data 250, the online system 140, when presenting content from content distribution programs 315, generates new predicted outcomes based on the received prediction improvement data 250. This may cause different content to be selected for presentation to a user compared to the selection process prior to receipt of the prediction improvement data 250.

For example, the online system 140 may in one case select a content item for presentation to a user for which a computed predicted outcome is highest or higher than a predicted outcome for an alternative content item. If using the process described here the online system 140 later determines that the alternative content item now has a higher relative predicted outcome, or that the presented content item has a lower relative predicted outcome, the online system 140 may instead in the future present the alternative content item to the user.

The process described above, with the collection of data at the data collector 240, the modeling of the outcome error, the receipt of the prediction improvement data 260, and the modification of the predicted outcome, may repeat as the online system 140 changes its methods of generating the predicted outcome, or as the third party system 130 generates more accurate models of the outcome error. For example, either the online system 140 or the third party system 130 develop additional feature data for the computation of the predicted outcome, or the modeling of the outcome error, respectively. These changes causes the previous data become stale, and so the new data is sent between the online system 140 and the third party system 130, updating the error modeling at the third party system 130 or updating the prediction improvement data 260 in order to update the computation of the predicted outcomes.

In addition to being used by the online system 140, the data collected here may also assist the third party system 130 in customizing their content distribution program specifications. For example, the third party program 130 may determine that a certain feature describing users is very predictive of the outcome error (i.e., increases the prediction accuracy by a threshold amount). Due to this, the third party system 130 may in the future specify users for content distribution programs that have some specific value for that feature.

For example, a third party system 130 may note a feature whereby whether a user has accessed a mobile application of the third party system 130 is able to improve the accuracy of its model of the outcome error. In the future, the third party system 130 may use this feature to identify users who used the mobile application, and specifically specify users of the online system 140 that have visited the mobile application when presenting content to users of the online system 140 in a new content distribution program.

IV. Exemplary Flow

Figure 4:
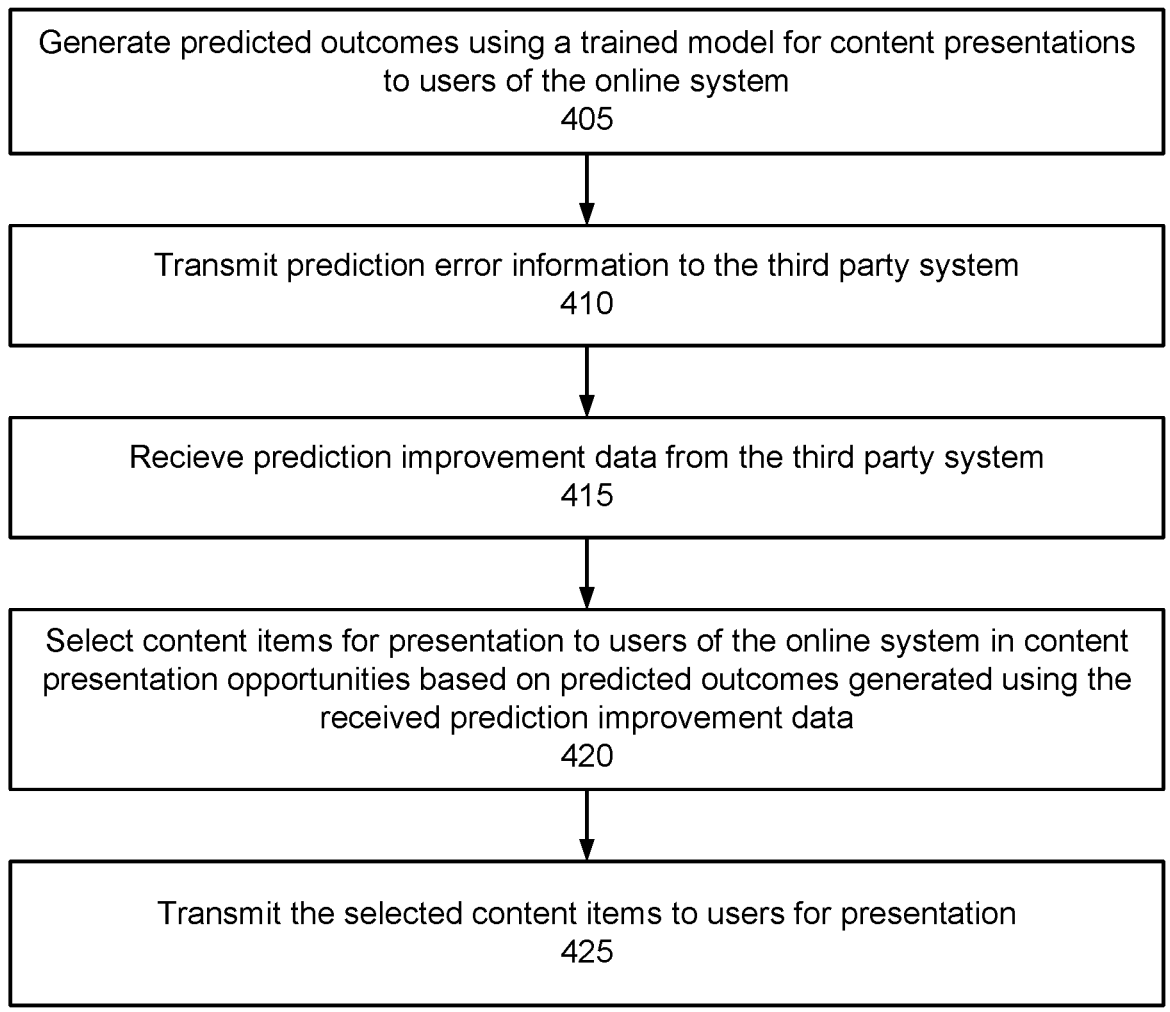
FIG. 4 is a flowchart of one embodiment of a method in an online system for transmitting data between the third party system and the online system to improve prediction of outcomes, according to an embodiment.

FIG. 4 is a flowchart of one embodiment of a method in an online system for transmitting data between the third party system and the online system to improve prediction of outcomes, according to an embodiment. In other embodiments, the method may include different and/or additional steps than those described in conjunction with FIG. 4. Additionally, in some embodiments, the method may perform the steps described in conjunction with FIG. 4 in different orders. In one embodiment, the method is performed by one or more of the modules of the online system 140 described above.

The online system 140 generates 505 predicted outcomes using a trained outcome prediction model for a plurality of content presentations to users of the online system 140. Each predicted outcome indicates a likelihood of a particular user interaction (e.g., a click, view, etc.) in response to a user being presented with the content from a third party system.

The online system 140 transmits 410 prediction error information to the third party system. The prediction error information includes information for the third party system to model an outcome error between the predicted outcomes and the actual outcomes. After transmitting the prediction error to the third party system 130, the third party system may train an error prediction model for the outcome error using input data sourced from the third party system.

The prediction error information may include, for each content presentation of content from the third party system, a predicted outcome and an actual outcome for the content presentation. Alternatively, the prediction error information may include, for each content presentation of content from the third party system, the outcome error for the content presentation (i.e., the difference in value between the predicted outcome and a numerical representation of the actual outcome for the content presentation). The prediction error information may also include content identifiers, user identifiers, and timestamps for the plurality of content presentations.

The third party system 130 transmits prediction improvement data to the online system, with the prediction improvement data including feature data based on selected input data. The input data is selected such that, when used on the error prediction model, increases the accuracy of the error prediction model by a threshold amount. Alternatively, the third party system 130 may transmit prediction improvement data to the online system 140, with the prediction improvement data including an adjustment factor used to adjust the predicted outcomes generated by the online system 140 to reduce the outcome error.

The online system 140 receives 415 the prediction improvement data from the third party system. As noted, the prediction improvement data includes additional data for the online system to reduce the outcome error in predicted outcomes generated during subsequent content presentation opportunities.

The online system 140 selects 420 content items for presentation to users of the online system in content presentation opportunities based on predicted outcomes generated using the received prediction improvement data.

When the prediction improvement data includes additional features, the online system 140 may re-train the outcome prediction model with the additional feature data as additional input data for the outcome prediction model. The online system may also generate predicted outcomes for pairs of content items and users in content presentation opportunities based on the re-trained outcome prediction model, and select content items for presentation to users in the content presentation opportunities based on the predicted outcomes generated for the respective pairs of content items and users.

Note that additional feature data may be obfuscated, such that the semantics of the additional feature data are undiscoverable from the additional feature data itself.

When the prediction improvement data includes an adjustment factor(s), the online system 140 may generate predicted outcomes for pairs of content items and users in content presentation opportunities based on the outcome prediction model, modify the predicted outcomes based on the adjustment factor(s), and select content items for presentation to users in the content presentation opportunities based on the modified predicted outcomes associated with the respective pairs of content items and users.

The online system 140 transmits 425 the selected content items to users for presentation.

V. Other Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
generating, at an online system, predicted outcomes using a trained outcome prediction model for a plurality of content presentations to users of the online system, where the outcome prediction model is trained to receive a plurality of input features and output a predicted outcome indicating a likelihood of a particular future user interaction in response to a user being presented with the content;
transmitting prediction error information to a third party system, the prediction error information including information for the third party system to model an outcome error between the predicted outcomes and the actual outcomes;
receiving prediction improvement data from the third party system, the prediction improvement data including data for additional features for the outcome prediction model to reduce the outcome error in predicted outcomes generated during subsequent content presentation opportunities;
re-training the outcome prediction model using the plurality of input features and the additional features as inputs to the outcome prediction model;
selecting content items for presentation to users of the online system in content presentation opportunities based on predicted outcomes generated using the re-trained outcome prediction model;
and transmitting the selected content items to users for presentation.

2. The method of claim 1, wherein transmitting the prediction error information to the third party system causes the third party system to train an error prediction model for the outcome error using input data sourced from the third party system.

3. The method of claim 2, wherein the third party system is further caused to transmit the prediction improvement data to the online system, the prediction improvement data including feature data based on selected input data, wherein the selected input data, when used on the error prediction model, increases the accuracy of the error prediction model by a threshold amount.

4. The method of claim 2, wherein the third party system is further caused to transmit the prediction improvement data to the online system, the prediction improvement data including an adjustment factor used to adjust the predicted outcomes generated by the online system to reduce the outcome error.

5. The method of claim 1, wherein the prediction improvement data includes additional feature data received from the third party system, and wherein the selecting content items for presentation to users of the online system further comprises:
   re-training the outcome prediction model with the additional feature data as additional input data for the outcome prediction model;
   generating predicted outcomes for pairs of content items and users in content presentation opportunities based on the re-trained outcome prediction model; and
   selecting content items for presentation to users in the content presentation opportunities based on the predicted outcomes generated for the respective pairs of content items and users.

6. The method of claim 1, wherein the data for the additional features are obfuscated, such that the semantics of the additional features data are undiscoverable from the data for the additional features.

7. The method of claim 1, wherein the prediction improvement data includes one or more adjustment factors for adjusting generated predicted outcomes, and wherein the selecting content items for presentation to users of the online system further comprises:
   generating predicted outcomes for pairs of content items and users in content presentation opportunities based on the outcome prediction model;
   modifying the predicted outcomes based on the adjustment factors; and
   selecting content items for presentation to users in the content presentation opportunities based on the modified predicted outcomes associated with the respective pairs of content items and users.

8. The method of claim 1, wherein the prediction error information comprises, for each content presentation of content from the third party system, a predicted outcome and an actual outcome for the content presentation.

9. The method of claim 1, wherein the prediction error information comprises, for each content presentation of content from the third party system, the outcome error for the content presentation, the outcome error being the difference in value between the predicted outcome and a numerical representation of the actual outcome for the content presentation.

10. The method of claim 1, wherein the prediction error information further includes content identifiers, user identifiers, and timestamps for the plurality of content presentations.

11. A computer program product comprising a non-transitory computer readable storage medium having instructions encoded thereon that, when executed by a processor, cause the processor to:
   generate, at an online system; predicted outcomes using a trained outcome prediction model for a plurality of content presentations to users of the online system, where the outcome prediction model is trained to receive a plurality of input features and output a predicted outcome indicating a likelihood of a particular future user interaction in response to a user being presented with the content;
   transmit prediction error information to a third party system, the prediction error information including information for the third party system to model an outcome error between the predicted outcomes and the actual outcomes;
   receive prediction improvement data from the third party system, the prediction improvement data including data for additional features for the outcome prediction model to reduce the outcome error in predicted outcomes generated during subsequent content presentation opportunities;
   re-train the outcome prediction model using the plurality of input features and the additional features as inputs to the outcome prediction model: select content items for presentation to users of the online system in content presentation opportunities based on predicted outcomes generated using the re-trained outcome prediction model;
   and transmit the selected content items to users for presentation.

12. The computer program product of claim 11, wherein transmission of the prediction error information to the third party system causes the third party system to train an error prediction model for the outcome error using input data sourced from the third party system.

13. The computer program product of claim 12, wherein the third party system is further caused to transmit the prediction improvement data to the online system, the prediction improvement data including feature data based on selected input data, wherein the selected input data, when used on the error prediction model, increases the accuracy of the error prediction model by a threshold amount.

14. The computer program product of claim 12, wherein the third party system is further caused to transmit the prediction improvement data to the online system, the prediction improvement data including an adjustment factor used to adjust the predicted outcomes generated by the online system to reduce the outcome error.

15. The computer program product of claim 11, wherein the prediction improvement data includes additional feature data received from the third party system, and wherein the non-transitory computer readable storage medium has further instructions encoded thereon for the selection of the content items for presentation to users of the online system, that when executed by the processor, cause the processor to:
   re-train the outcome prediction model with the additional feature data as additional input data for the outcome prediction model;
   generate predicted outcomes for pairs of content items and users in content presentation opportunities based on the re-trained outcome prediction model; and
   select content items for presentation to users in the content presentation opportunities based on the predicted outcomes generated for the respective pairs of content items and users.

16. The computer program product of claim 15, wherein the data for the additional features are obfuscated, such that the semantics of the additional features data are undiscoverable from the data for the additional features.

17. The computer program product of claim 11, wherein the prediction improvement data includes one or more adjustment factors for adjusting generated predicted outcomes, and wherein the non-transitory computer readable storage medium has further instructions encoded thereon for the selection of content items for presentation to users of the online system, that when executed by the processor, cause the processor to:
generate predicted outcomes for pairs of content items and users in content presentation opportunities based on the outcome prediction model;
modify the predicted outcomes based on the adjustment factors; and
select content items for presentation to users in the content presentation opportunities based on the modified predicted outcomes associated with the respective pairs of content items and users.

18. The computer program product of claim 11, wherein the prediction error information comprises, for each content presentation of content from the third party system, a predicted outcome and an actual outcome for the content presentation.

19. The computer program product of claim 11, wherein the prediction error information comprises, for each content presentation of content from the third party system, the outcome error for the content presentation, the outcome error being the difference in value between the predicted outcome and a numerical representation of the actual outcome for the content presentation.

20. The computer program product of claim 11, wherein the prediction error information further includes content identifiers, user identifiers, and timestamps for the plurality of content presentations.

* * * * *

UNITED STATES PATENT AND TRADEMARK OFFICE
CERTIFICATE OF CORRECTION

PATENT NO. : 10,936,954 B2
APPLICATION NO. : 15/447068
DATED : March 2, 2021
INVENTOR(S) : Andrew Donald Yates et al.

Page 1 of 1

It is certified that error appears in the above-identified patent and that said Letters Patent is hereby corrected as shown below:

In the Claims

In Column 20, Claim 11, Line 5, delete "system;" and insert -- system, --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*